(12) United States Patent
Kidokoro et al.

(10) Patent No.: US 12,737,332 B2
(45) Date of Patent: Sep. 15, 2026

(54) DATA SAMPLING METHOD THAT MAINTAINS ACCURACY FOR DATA ANALYSIS

(71) Applicant: International Business Machines Corporation, Armonk, NY (US)

(72) Inventors: Shuho Kidokoro, Ichikawa (JP); Yojiro Adachi, Yokohama (JP); Tomoyuki Kawamukoh, Chiba (JP); Tomokazu Ohtsu, Sakura (JP)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 18/060,632

(22) Filed: Dec. 1, 2022

(65) Prior Publication Data

US 2024/0184756 A1 Jun. 6, 2024

(51) Int. Cl.

| | |
|---|---|
| ***G06F 16/215*** | (2019.01) |
| ***G06F 16/2458*** | (2019.01) |
| ***G06F 16/28*** | (2019.01) |

(52) U.S. Cl.

CPC ........ *G06F 16/215* (2019.01); *G06F 16/2458* (2019.01); *G06F 16/283* (2019.01)

(58) Field of Classification Search

CPC ... G06F 16/215; G06F 16/2458; G06F 16/283
USPC .......................................................... 707/687
See application file for complete search history.

(56) References Cited

U.S. PATENT DOCUMENTS 9,870,398 B1 * 1/2018 Kim .................. G06F 16/24542
9,928,281 B2 3/2018 Bourbonnais et al.
2006/0112093 A1 * 5/2006 Lightstone ............ G06F 16/221 707/999.005
2009/0083215 A1 * 3/2009 Burger ................ G06F 16/2462
(Continued)

FOREIGN PATENT DOCUMENTS

CN 103674639 A 3/2014
CN 113868141 A * 12/2021 .......... G06F 11/3688
(Continued)

OTHER PUBLICATIONS

Krishnan et al., "Stale View Cleaning: Getting Fresh Answers from Stale Materialized Views", Proceedings of the VLDB Endowment , Aug. 31-Sep. 4, 2015, Kohala Coast, Hawaii, vol. 8, No. 12, pp. 1370-1381. (Year: 2015).*

(Continued)

*Primary Examiner* — Phuong Thao Cao
(74) *Attorney, Agent, or Firm* — CANTOR COLBURN LLP; Stephen Yoder

(57) ABSTRACT

According to an aspect, a computer-implemented method includes collecting statistics of an original database and collecting statistics of a sampling database that includes a subset of the original database. The statistics of the original database are periodically updated. The statistics of the original database and the statistics of the sampling database are periodically compared to determine whether the sampling database is within a predetermined threshold of the original database. In response to determining that the sampling database is not within the predetermined threshold of the original database, an update to the sampling database is initiated.

17 Claims, 8 Drawing Sheets

(56) References Cited

U.S. PATENT DOCUMENTS

| | | | | |
|---|---|---|---|---|
| 2012/0330900 | A1* | 12/2012 | Patwardhan | G06F 16/2462 707/690 |
| 2016/0110417 | A1* | 4/2016 | Lakshminarayan | G06F 16/24542 707/718 |
| 2017/0024452 | A1 | 1/2017 | Budalakoti et al. | |
| 2018/0107715 | A1* | 4/2018 | Chen | G06F 17/18 |
| 2019/0095487 | A1* | 3/2019 | Le | G06F 16/24534 |
| 2020/0185069 | A1* | 6/2020 | Jeppson | G16H 15/00 |
| 2021/0133195 | A1* | 5/2021 | Jiang | G06N 20/00 |
| 2021/0406717 | A1* | 12/2021 | Tauheed | G06N 20/10 |
| 2022/0075770 | A1* | 3/2022 | Beier | G06F 16/235 |
| 2022/0374439 | A1* | 11/2022 | Hu | G06F 16/2365 |

FOREIGN PATENT DOCUMENTS

| | | | | |
|---|---|---|---|---|
| CN | 108960269 B | * | 5/2022 | G06F 18/211 |
| KR | 20210000041 A | | 1/2021 | |
| SG | 10201406215 | * | 4/2016 | G06Q 30/0201 |

OTHER PUBLICATIONS

M. Hornick, "To sample or not to sample . . . Part 2", Oracle Machine Learning, 2021, 4 pages.

IBM, "Materialized Query Tables and Automatic Query Rewrite", Retrieved from: https://www.ibm.com/docs/en/db2-for-zos/12.0.0?topic=rewrite-materialized-query-tables-automatic-query, Dec. 16, 2021, 3 pages.

* cited by examiner

404

| DB name | Statistics type | Frequency | Target column | Cardinality | Class ID | Min value in class | Max value in class | Relative frequency |
|---|---|---|---|---|---|---|---|---|
| Original DB | total number of records | 100,000 | - | - | - | - | - | - |
| Original DB | column cardinality | - | COL1 | 300 | - | - | - | - |
| Original DB | histogram | 35,000 | COL1 | 40 | 1 | 1 | 55 | 0.35 |
| Original DB | histogram | 29,000 | COL1 | 60 | 2 | 60 | 300 | 0.29 |
| Original DB | histogram | 36,000 | COL1 | 200 | 3 | 300 | 1,000 | 0.36 |

| DB name | Statistics type | Frequency | Target column | Card-inality | Class ID | Min value in class | Max value in class | Relative frequency | Sampling target table name |
|---|---|---|---|---|---|---|---|---|---|
| Sampling DB | total number of records | 10,000 | - | | - | - | - | - | Original DB |
| Sampling DB | column cardinality | - | COL1 | 190 | - | - | - | - | Original DB |
| Sampling DB | histogram | 3,200 | COL1 | 20 | 1 | 1 | 55 | 0.32 | Original DB |
| Sampling DB | histogram | 3,500 | COL1 | 40 | 2 | 60 | 300 | 0.35 | Original DB |
| Sampling DB | histogram | 3,300 | COL1 | 130 | 3 | 300 | 1,000 | 0.33 | Original DB |

| | |
|---|---|
| sampling rate | 10% |
| acceptable error | 10% |
| error check frequency | 24 hours |
| resampling method | manual |
| : | : |

FIG. 7

| DB name | Statistics type | Frequency | Target column | Cardinality | Class ID | Min value in class | Max value in class | Relative freq. |
|---|---|---|---|---|---|---|---|---|
| Original DB | histogram | 35,000 | COL1 | 40 | 1 | 1 | 55 | 0.35 |
| Original DB | histogram | 29,000 | COL1 | 60 | 2 | 60 | 300 | 0.29 |
| Original DB | histogram | 36,000 | COL1 | 200 | 3 | 300 | 1,000 | 0.36 |

DATA SAMPLING METHOD THAT MAINTAINS ACCURACY FOR DATA ANALYSIS

BACKGROUND

The present invention generally relates to data sampling, and more specifically, to computer systems, computer-implemented methods, and computer program products for providing data sampling that maintains accuracy for data analysis.

Data fabric is an architecture that facilitates the end-to-end integration of various data pipelines and cloud environments through the use of intelligent and automated systems. Over the last decade, developments within hybrid cloud, artificial intelligence, the internet of things (IoT), and edge computing have led to the exponential growth of big data, creating even more complexity for enterprises to manage. This growth has created significant challenges, such as data silos, security risks, and general bottlenecks to decision making. Data fabric approaches can be used to address these challenges and to unify disparate data systems, embed governance, strengthen security and privacy measures, and provide more data accessibility to workers (e.g., business users).

Data sampling is a statistical analysis approach that is used to select, manipulate, and analyze a representative subset of data points to identify patterns and trends in the larger data set being examined. Data sampling allows data scientists, predictive modelers, and other data analysts to works with a small, manageable amount of data about a statistical population to build and run analytical models more quickly. Sampling can be particularly useful with data sets that are too large to efficiently analyze in full, for example in big data analytics applications or surveys. Identifying and analyzing a representative sample is often more efficient and cost-effective than surveying the entirety of the data or population.

SUMMARY

Embodiments of the present invention are directed to a computer-implemented method for providing data sampling that maintains accuracy for data analysis. The method includes collecting statistics of an original database and collecting statistics of a sampling database that includes a subset of the original database. The statistics of the original database are periodically updated. The statistics of the original database and the statistics of the sampling database are periodically compared to determine whether the sampling database is within a predetermined threshold of the original database. In response to determining that the sampling database is not within the predetermined threshold of the original database, an update to the sampling database is initiated.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a statistics recording table for an original database in accordance with one or more embodiments of the present invention;

FIG. 6 depicts a statistics recording table for a sampling database in accordance with one or more embodiments of the present invention;

FIG. 7 depicts a sampling definition structure in accordance with one or more embodiments of the present invention.

DETAILED DESCRIPTION

Figure 1:
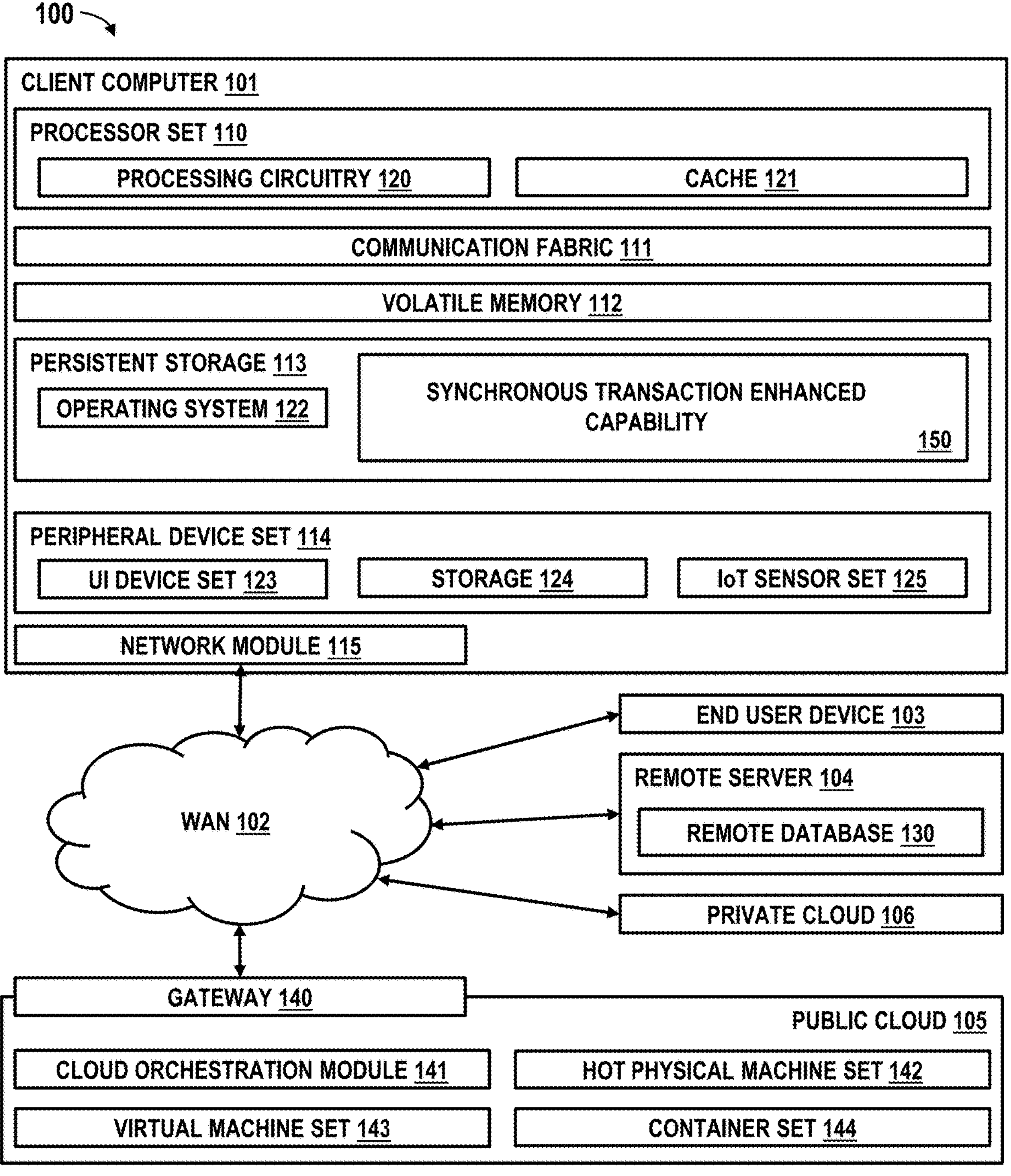
FIG. 1 depicts a block diagram of an example computer system for use in conjunction with one or more embodiments of the present invention.

Embodiments of the present invention are directed to a data sampling method that maintains accuracy for data analysis. In accordance with one or more embodiments of the present invention, the accuracy of sampling data is continuously monitored and evaluated.

Data fabric is an architecture that enables data analysts to access data without being aware of the physical characteristics or locations of the data (data sources can be scattered around in different locations). In current implementations of the data fabric architecture, there can be issues with publishing the data, or making it available for use by one or more application programs. For example, the size of business data tends to be large, so publishing all data may result in a large overhead on various parts of the architecture such as, but not limited to the data source which provides the data, the network which transfers the data, and the application programs which receive the data.

One or more embodiments of the present invention address the issues caused by large amounts of data being published by publishing a subset of the data which was previously sampled from the original data. Using contemporary approaches, data can be sampled using structured query language (SQL). However, with conventional approaches, the accuracy of the sampled data can't be assured. In addition, contemporary approaches do not take into account the impact of any updates to the original data set, or database table, which can degrade the accuracy of the sampling data. One or more embodiments of the present invention address one or more of the above noted issues with contemporary approaches to data sampling by continuously evaluating the accuracy of the sampling data in order to publish accurate sampling data in a data fabric environment. The ability to use sampling data in place of the original large volumes of data can provide technical improvements by decreasing the overhead at the data source environment, decreasing traffic on the network(s) transferring the data, and decreasing the overhead on the data target environment executing an application(s) which operates on the data (e.g., an analytics service). In addition, processing time and processor cycles at the data target environment can be reduced because fewer transactions are required to operate on the data.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as providing data sampling that maintains accuracy for data analysis 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
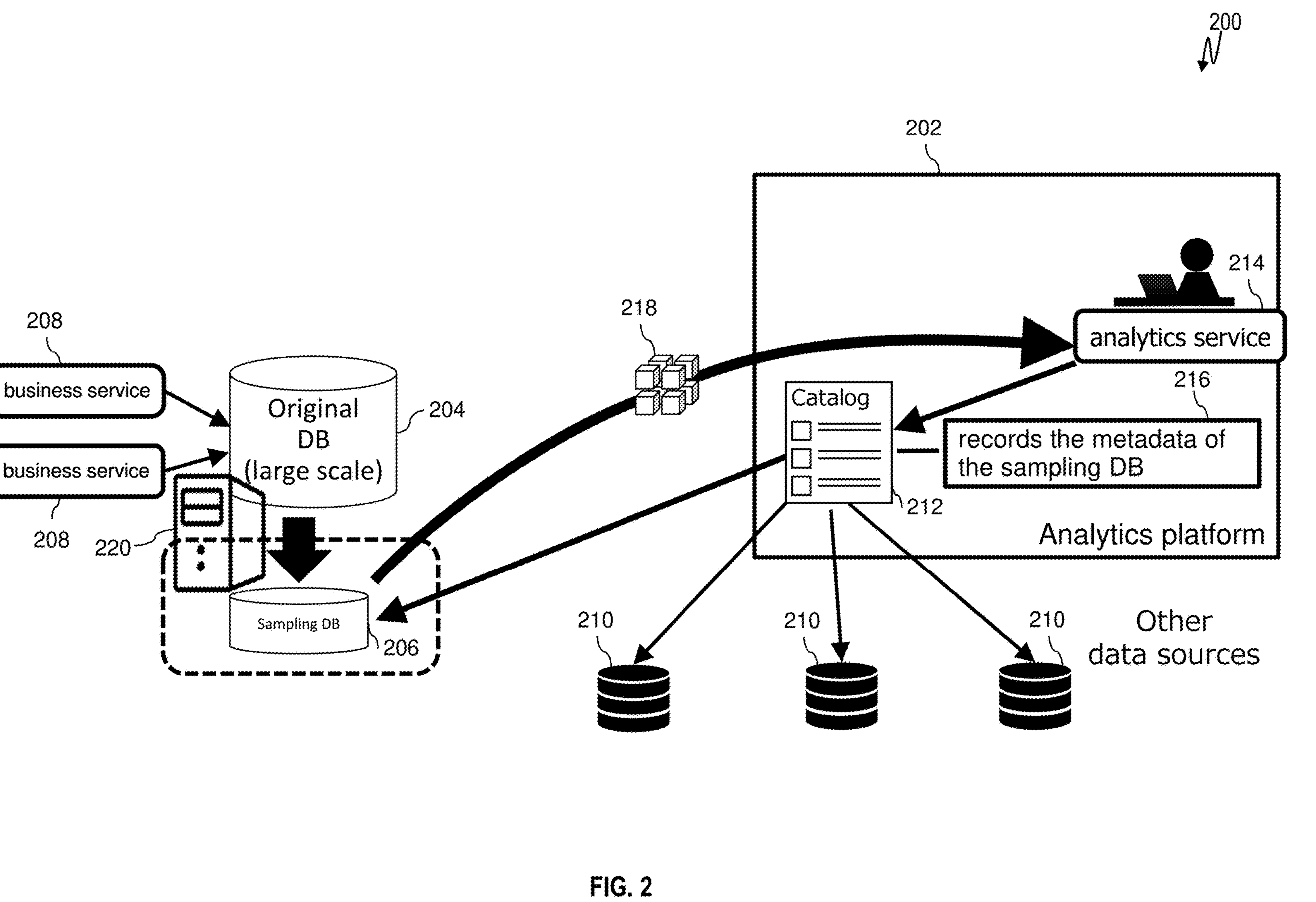
FIG. 2 depicts a block diagram of components of a framework for providing data sampling that maintains accuracy for data analysis in accordance with one or more embodiments of the present invention.

Turning now to FIG. 2, a block diagram 200 of components of a framework for providing data sampling that maintains accuracy for data analysis is generally shown in accordance with one or more embodiments of the present invention. In accordance with one or more embodiments of the present invention, the components shown in FIG. 2 are implemented by one or more elements of the computing environment 100 shown in FIG. 1. All or a subset of the components shown in FIG. 2 can be implemented by all or a portion of the elements of the computing environment 100 shown in FIG. 1.

The components shown in FIG. 2 include business services 208, a data processing platform 220, an analytics platform 202, and other data sources 210. As shown in FIG. 2, business services 208 (e.g., shopping, banking, entertainment) use an original database 204 to store data related to the services that they provide. Contents of the original database 204 are sampled to create sampling database 206 which includes a subset of the data in the original database 204. In accordance with one or more embodiments of the present invention, the sampling database 206 has the same data characteristics as the original database 204. In accordance with one or more embodiments of the present invention, the database can be implemented by any method of organizing data known in the art such as, but not limited to DB2® from International Business Machines Corporation or Oracle RDBMS Database.

In accordance with one or more embodiments of the present invention, when data in the original database 204 is updated, the data characteristics, or statistics, of the original database 204 are compared to the data characteristics, or statistics, of the sampling database 206. If this comparison results in a difference (error) that is not acceptable (e.g., not within a predetermined threshold), then the sampling database 206 is recreated. The comparison can be performed after every update to the original database 204 or after a specified number of updates to the original database 204 (e.g., 3, 5, 10, 50, 100, etc.), and/or at a specified time period (e.g., every hour, every day, once a week, etc.) or at a specified time/date. Recreating the sampling database 206 can include creating a new sampling database 206 or making updates to the existing sampling database 206.

As shown in FIG. 2, the original database 204 and the sampling database 206 are operating on the data processing platform 220. The contents 218 of the sampling database 206 are sent (e.g., via a network) to an analytics service 214 on the analytics platform 202.

As shown in FIG. 2, at block 216, a data engineer or database administrator records the metadata of the sampling database 206 (and not the original database 204) in the catalog 212. The metadata can include, but is not limited to the location of the sampling database 206, a location of the data within the sampling database 206 (e.g., row/column), a data type of the data (e.g., integer, character), and/or a label associated with the data. The catalog 212 can be used by the analytics service 214 to locate the data from the sampling database 206 as well as data from one or more other data sources 210.

Figure 3:
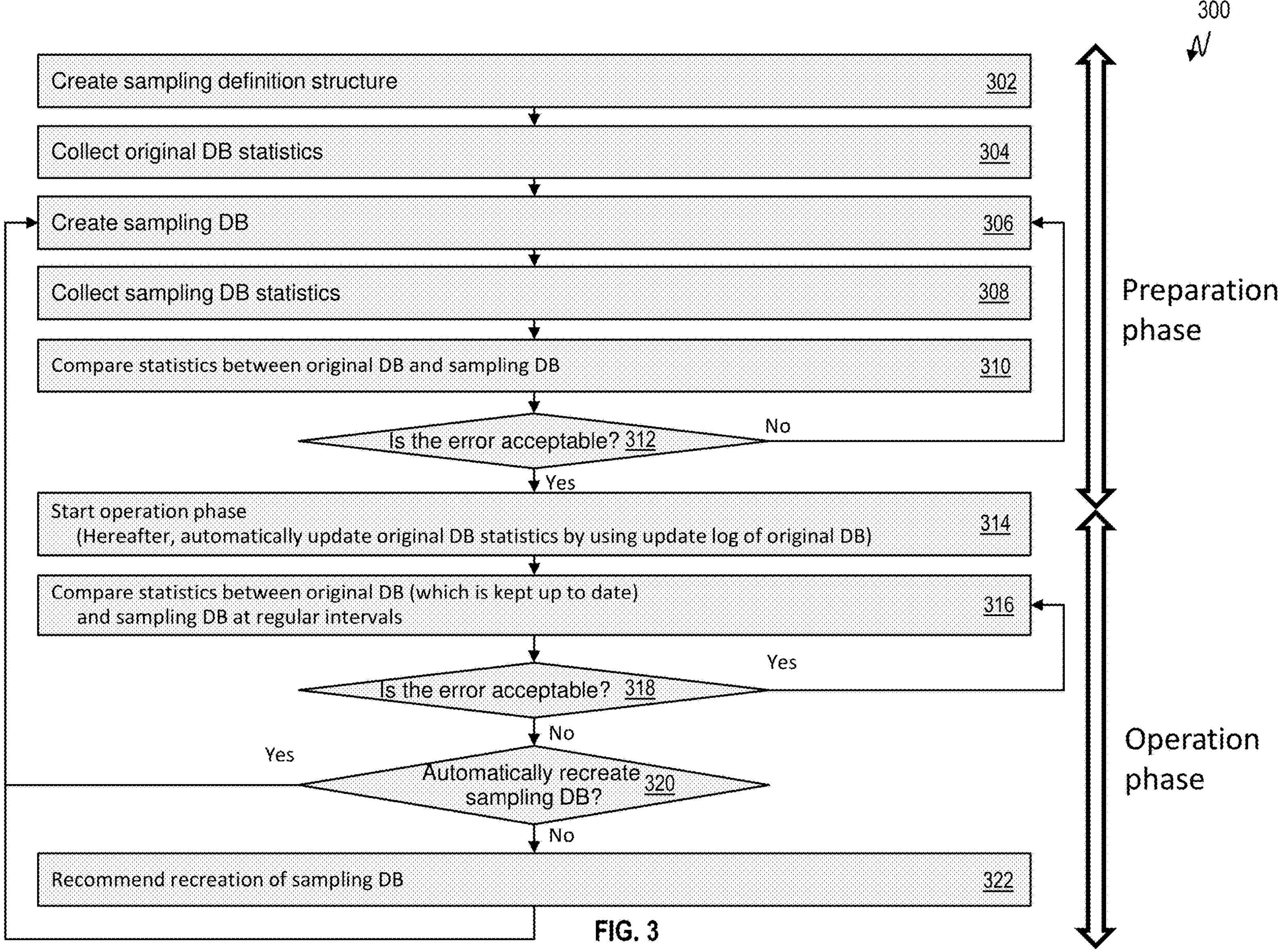
FIG. 3 depicts a flowchart of a method for providing data sampling that maintains accuracy for data analysis in accordance with one or more embodiments of the present invention.

Turning now to FIG. 3, a flowchart of a method 300 for providing data sampling that maintains accuracy for data analysis is generally shown in accordance with one or more embodiments of the present invention. In one or more embodiments, the processing shown in FIG. 3 is performed by a processing platform, such as data processing platform 220, executing in the computing environment 100 of FIG. 1. The flowchart shown in FIG. 3 may include additional steps not depicted in FIG. 3. Although depicted in a particular order, the blocks depicted in FIG. 3 can be rearranged, subdivided, and/or combined.

At block 302, a sampling definition structure is created. For each database to be sampled, the sampling definition can include, but is not limited to a sampling rate, an acceptable error of statistics (also referred to herein as "predetermined threshold"), acceptable error checking timing for statistics, and/or sampling database rebuild techniques (e.g., automatic or manual by outputting a recommendation). An example of an embodiment of a sampling definition structure is shown in FIG. 7 and described below.

At block 304, database statistics for an original database, such as original database 204 of FIG. 2, are collected. The statistics can include, but are not limited to the overall record count, the cardinality, frequency statistics, and/or histogram statistics of the original database. An example of contents of an embodiment of a statistics recording table for the original database is shown in FIG. 5 and described below.

At block 306 of FIG. 3, a sampling database, such as sampling database 206 of FIG. 2, is created. The sampling database can be created in an offline manner without impacting business processes, such as business services 208 of FIG. 2, that are accessing the original database. The sampling database is created based on the contents of the sampling definition which describes, among other things, an amount of data to be included and an acceptable amount of difference (a predetermined threshold) between the sampling database and the original database. Any sampling technique known in the art can be utilized such as, but not limited to quota sampling or purposive sampling to ensure that the criteria in the sampling definition structure are met when the sampling database is first created, or via random sampling.

Still referring to FIG. 3, at block 308 sampling database statistics are created. The statistics can include, but are not limited to the overall record count, the cardinality, frequency statistics, and/or histogram statistics of the original database. An example of contents of a statistics recording table for the sampling database is shown in FIG. 6. At block 310, the statistics between the original database and the sampling database are compared, and at block 312 it is determined whether an error rate between the two is acceptable (e.g., is the sampling database within a predetermined threshold of the original database).

If it is determined at block 312 that the sampling database is not valid (e.g., that the sampling database is not within the predetermined threshold of the original database), then processing continues at block 306 with creating a new sampling database. As shown in FIG. 3, blocks 302 through 312 are part of the preparation phase, where a sampling database that meets the predetermined threshold value(s) is created.

Figure 8:
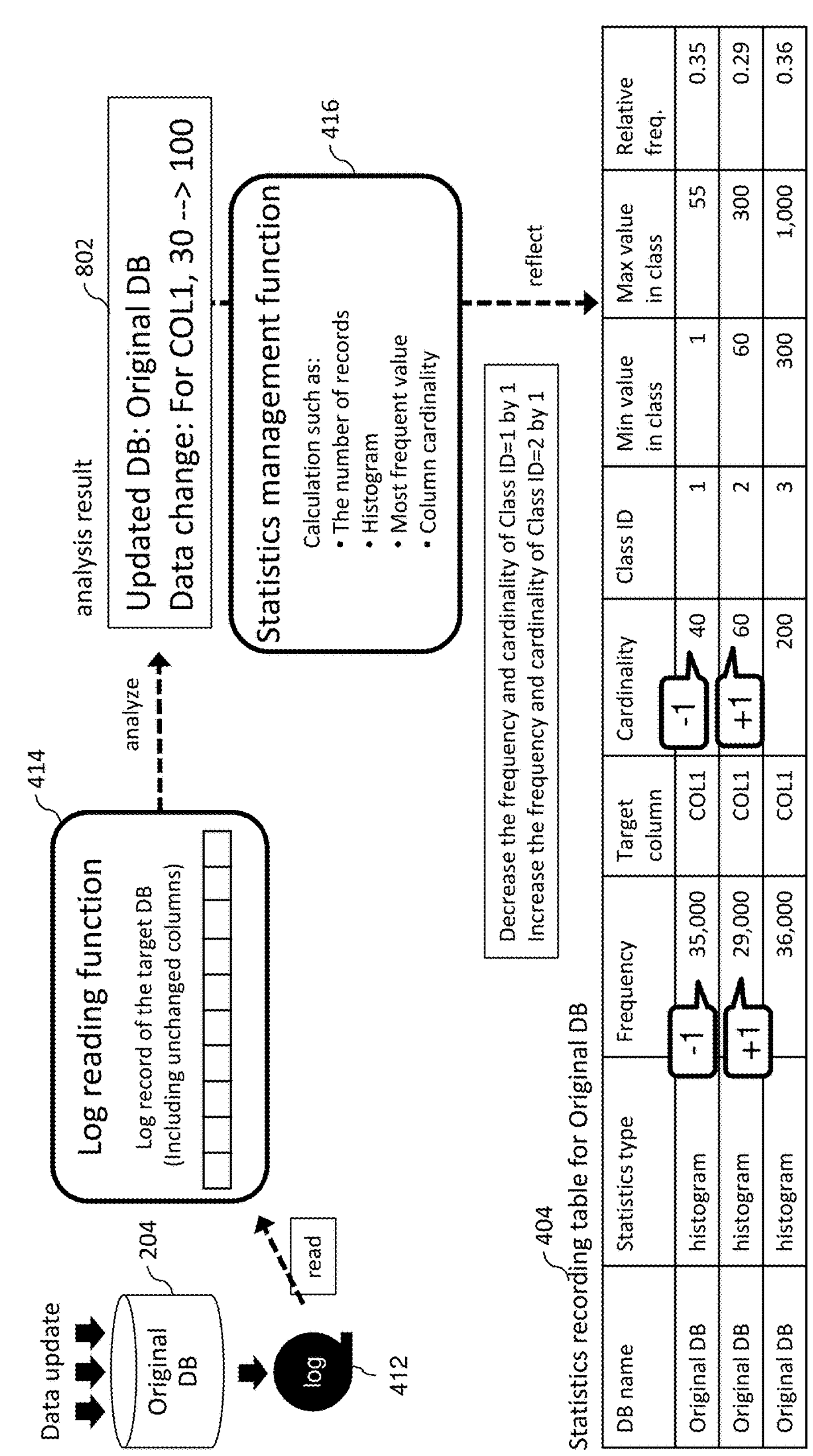
FIG. 8 depicts a block diagram of a statistics management function in accordance with one or more embodiments of the present invention.

If it is determined at block 312 that the sampling database is valid, the processing continues at block 314 with starting the operation phase which as shown in FIG. 3 includes blocks 314 through 322. When the operation phase is started at block 314, a process to automatically update the original database statistics by using update logs of the original database is initiated. The automatic updates can be performed in real time each time that the original database is updated or on some other periodic bases (e.g., based on time or a number of updates). An example of an embodiment of the automatic update process is shown in FIG. 8 and described below.

Figure 4:
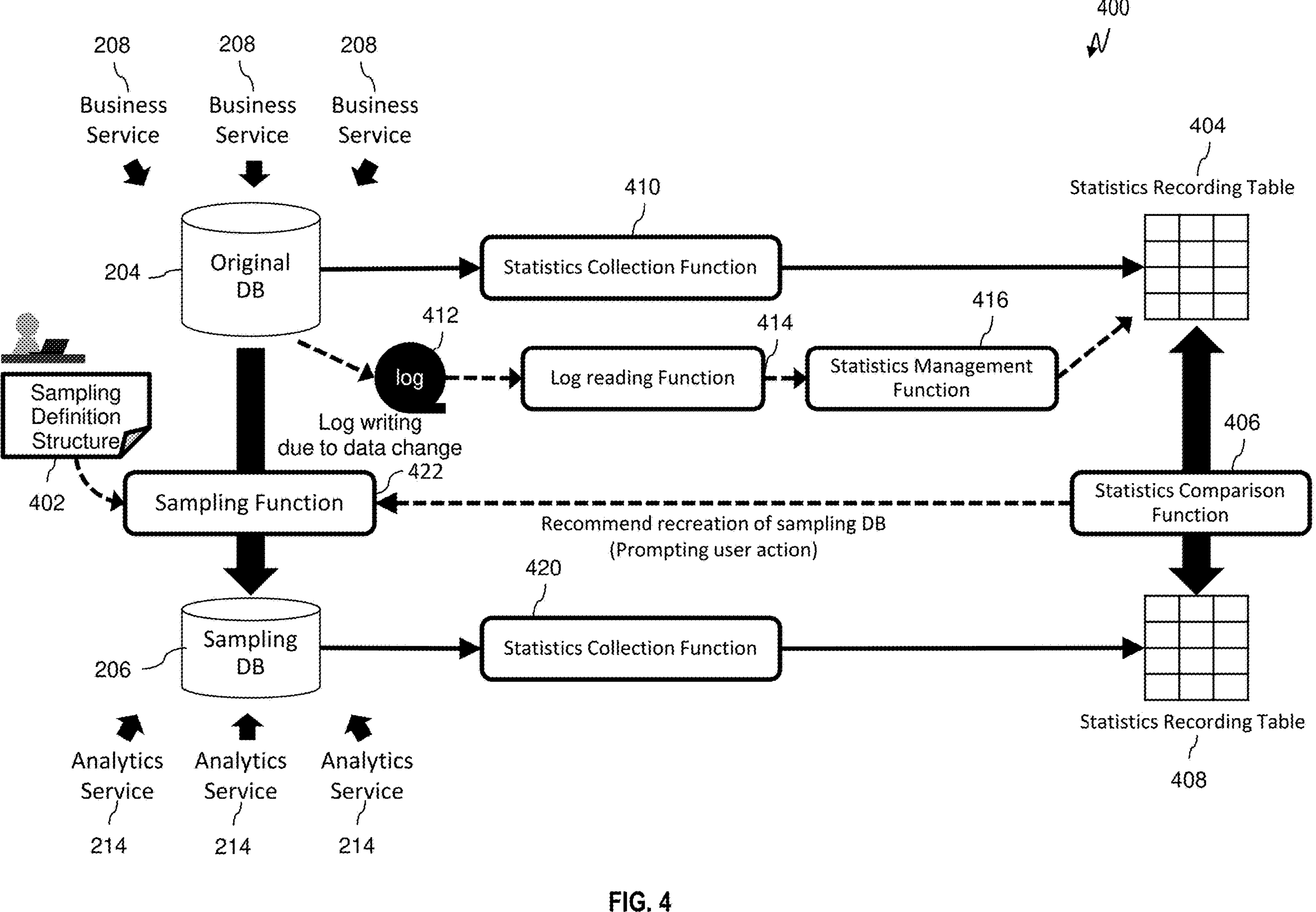
FIG. 4 depicts a block diagram of intelligent sampling in accordance with one or more embodiments of the present invention.

At block 316 of FIG. 3, the statistics between the original database and the sampling data base are compared at regular intervals (e.g., periodically based on time or events such as a number of updates to the original database). An example of the comparing is shown in FIG. 4 and described below. At block 318 it is determined whether an error rate between the two is acceptable (e.g., if the sampling database is within the predetermined threshold of the original database). If it is determined at block 318 that error rate is acceptable, then processing continues at block 316.

If it is determined at block 318 that the sampling database is not valid (e.g., that the sampling database is not within the predetermined threshold of the original database), then processing continues at block 320 with determining how to initiate an update to the sampling database. If it is determined at block 320 that the sampling definition structure indicates that the sampling database should be automatically recreated, then processing continues at block 306 with creating a new sampling database. Otherwise, if it is determined at block 320 that the sampling definition structure indicates that the sampling database should be manually recreated, then processing continues at block 322 with outputting a recommendation to recreate the sampling database. In response to the recipient (e.g., a user of the analytics service or a system administrator) of the recommendation requesting that the sampling database be recreated, processing continues at block 306.

Turning now to FIG. 4, a block diagram 400 of components used to perform intelligent sampling is generally shown in accordance with one or more embodiments of the present invention. In one or more embodiments, the processing shown in FIG. 4 is performed by a processing platform, such as data processing platform 220, executing in the computing environment 100 of FIG. 1. As shown in FIG. 4, business services 208 use the original database 204, typically in conjunction with application programs, to perform business functions. An original database statistics collection function 410 collects statistics about the original database 204 that is being sampled and enters them in a statistics recording table 404 for the original database 204. An example embodiment of the statistics recording table 404 for the original database is shown in FIG. 5 and described below.

As shown in FIG. 4, sampling function 422 generates the sampling database 206 (e.g., during the preparation phase of FIG. 3) based on the original database 204 and a sampling definition structure 402. In addition, as shown in FIG. 4 (and also as part of the preparation phase of FIG. 3), a sampling database statistics collection function 420 (which may be the same software as the original database statistics collection function 410) collects statistics about the sampling database 206 and enters them into a statistics recording table 408 for the sampling database. An example of an embodiment of the statistics recording table 408 for the sampling database is shown in FIG. 6 and described below.

As shown in FIG. 4, one or more analytic services 214 access the sampling database 206 instead of the original database 204. Also as shown in FIG. 4, sampling function 422 performs the sampling based at least in part on a sampling definition structure 402. An example embodiment of the sampling definition structure 402 is shown in FIG. 7 and described below.

Still referring to FIG. 4, during the operation phase of FIG. 3, log reading function 414 reads entries in the database log 412 that have been written in response to data changes in the original database 204. The log reading function 414 sends collected content from records in the log 412 to statistics management function 416 which analyzes the content and updates the statistics recording table 404 for the original database. An example of processing performed by an embodiment of the statistics management function 416 is shown in FIG. 8 and described below. On a periodic basis, a comparison between the contents of the statistics recording table 404 for the original database and the statistics recording table 408 for the sampling database is performed by statistics comparison function 406. Based on the results of the comparison, the statistics comparison function 406 may initiate recreation of the sampling database 206 either via automatically executing the sampling function 422 or via a manual method that can include recommending to a user that they execute the sampling function 422.

Turning now to FIG. 5, a statistics recording table 404 for an original database is generally shown in accordance with one or more embodiments of the present invention. The columns shown in FIG. 5 include the database name, a statistics type, a frequency, a target column, a cardinality, a class identifier, a minimum value in the class, a maximum value in the class, and a relative frequency. As shown in the statistics recording table 404 of FIG. 5, the record count, or total number of records in the original database is 100,000; and the cardinality of COL1 in the original database is 300 (i.e., there are 300 different values in COL1).

The class value (histogram) statistic shown in the statistics recording table 404 of FIG. 5 is derived as follows: for a given column (in this example COL1), the data is divided into several classes (intervals) and the number of records in each class is expressed as a frequency. The total frequency is the sum of frequencies for all classes, and the relative frequency is the frequency of the class divided by the total frequency. For example, as shown in the statistics recording table 404 of FIG. 5, there are three classes in COL1 each having a Class ID value: Class ID 1 which has 35,000 members and includes values that range from 1 (minimum value in class) to 55 (maximum value in class); Class ID 2 which has 29,000 members and includes values that range from 60 to 300; and Class ID 3 which has 36,000 members and includes values that range from 300 to 1,000. As shown in the fourth row 502 of the statistics recording table 404, the relative frequency of Class ID 2 is 0.29, meaning that 29% of the records in the original database 204 have a value in the range of 60 to 300 in COL1.

The statistics for a single column, COL 1 are shown in the statistics recording table 404 of FIG. 5. It should be appreciated that similar statistics can be maintained for all or a subset of the columns in the original database. In addition, the number of classes (in this example there were three) per column can vary based on implementation or customer requirements.

Turning now to FIG. 6, a statistics recording table 408 for a sampling database is generally shown in accordance with one or more embodiments of the present invention. The columns shown in FIG. 6 include the database name, a statistics type, a frequency, a target column, a cardinality, a class identifier, a minimum value in the class, a maximum value in the class, a relative frequency, and a sampling target table name (i.e., the database table used to create the sampling database). As shown in the statistics recording table 408 of FIG. 5, the record count, or total number of records in the sampling database is 10,000; the cardinality of COL1 is 190.

As shown in the statistics recording table 408 of FIG. 6, there are three classes in COL1 each having a Class ID value: Class ID 1 which has 3,200 members and includes values from 1 (minimum value in class) to 55 (maximum value in class); Class ID 2 which has 3,500 members and includes values from 60 to 300; and Class ID 3 which has 3,300 members and includes values from 300 to 1,000. As shown in the fourth row 602 of the statistics recording table 408, the relative frequency of Class ID 2 is 0.35.

The statistics for a single column, COL 1 are shown in the statistics recording table 408 of FIG. 6. It should be appreciated that similar statistics can be maintained for all or a subset of the columns in the sampling database. In addition, the number classes (in this example there were three) per column can vary.

In accordance with one or more embodiments of the present invention, the columns in the original database and the sampling database are broken up into the same number of classes with the same minimum and maximum values in each class.

Turning now to FIG. 7, a sampling definition structure 402 is generally shown in accordance with one or more embodiments of the present invention. The sampling definition structure 402 shown in FIG. 7 includes a sampling rate, an acceptable error, an error checking frequency, and a resampling method. The contents of the sampling definition structure 402 can be modified and customized to a particular data processing environment, to a particular database, and or to particular requirements from a user (e.g., at an analytics platform). The sampling rate indicates an amount of data to be included in the sampling database. In this example, the sampling database will include ten percent of the records in the original database. The acceptable error, or predetermined threshold, indicates a degree of acceptable difference between the statistics of the original database and the sampling database. In this example, the acceptable error rate is ten percent, which means that the sampling database should be recreated if the difference between the statistics is more than ten percent. In addition, the comparison between the statistics will be performed every 24 hours which is specified in the sampling definition structure 402 as the error check frequency.

In accordance with one or more embodiments of the present invention, a relative frequency error of each class can be calculated using the following formula: |(1−(the relative frequency of a class in a column of the sampling database/the relative frequency of the same class in the same column of the original database)| multiplied by 100. Using the data from the statistics recording table 404 of the original database shown in FIG. 5 and the statistics recording table 408 for the sampling database shown in FIG. 6, the relative frequency error of each class can be calculated. For Class ID 1 this can be calculated as: (|1−(0.32/0.35)) multiplied by 100=8.6%, which is within the predefined threshold of 10%. For Class ID 2 this can be calculated as: (|1−(0.35/0.29)) multiplied by 100=20.7%, which is not within the predefined threshold of 10%. For Class ID 3 this can be calculated as: (|1−(0.33/0.36)) multiplied by 100=8.3%, which is within the predefined threshold of 10%. In this example, the sampling database is not within the predetermined threshold of the original database because of Class ID 2 of COL 1, and therefore an update to the sampling database will be initiated. Based on contents of the sampling definition structure 402, the resampling method is manual which in accordance with one or more embodiments includes sending a recommendation to a user to recreate the sampling database.

Turning now to FIG. 8, a block diagram 800 of a statistics management function is generally shown in accordance with one or more embodiments of the present invention. As shown in FIG. 8, a data update is applied to the original database 204 and written to the log 412 which is read and analyzed by the log reading function 414. The analysis result 802 shown in FIG. 8 includes a data change in COL 1 from a value of 30 to a value of 100. This information is input to the statistics management function 416 which updates the statistics recording table 404 for the original database. The update shown in the example of FIG. 8 includes decreasing the frequency and cardinality of Class ID 1 by 1, and increasing the frequency and cardinality of Class ID 2 by 1. This ability to keep the statistic up to date in real time using the log data can avoid having to scan the entire original table to collect the statistics prior to each comparison with statistics of the sampling database.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

collecting statistics of an original database;

collecting statistics of a sampling database that comprises a subset of the original database;

periodically updating the statistics of the original database in response to an update to the original database and based at least in part on a log of the original database;

periodically comparing the statistics of the original database and the statistics of the sampling database to determine whether the sampling database is within a predetermined threshold of the original database; and in response to determining that the sampling database is not within the predetermined threshold of the original database, initiating an update to the sampling database and causing an analytics service to access the sampling database instead of the original database to perform data analysis, thereby reducing processing overhead and network traffic.

2. The computer-implemented method of claim 1, wherein the initiating an update to the sampling database comprises outputting a recommendation to recreate the sampling database based at least in part on the original database.

3. The computer-implemented method of claim 1, wherein the initiating an update to the sampling database comprises automatically recreating the sampling database based at least in part on the original database.

4. The computer-implemented method of claim 1, wherein the initiating an update to the sampling database comprises one of outputting a recommendation to update a subset of the sampling database based at least in part on the original database and automatically updating a subset of the sampling database based at least in part on the original database.

5. The computer-implemented method of claim 1, further comprising:

creating a sampling definition structure; and creating the sampling database based at least in part on the sampling definition structure and the original database.

6. The computer-implemented method of claim 5, wherein the sampling definition structure comprises a sampling rate, the predetermined threshold, a frequency of the comparing, and an action performed in response to the initiating an update.

7. The computer-implemented method of claim 1, wherein the statistics of the original database and the statistics of the sampling database each comprise an overall record count, a cardinality of a column, and a histogram statistic for the column.

8. The computer-implemented method of claim 1, wherein the comparing comprises comparing a relative frequency of a range of values in a column.

9. A system comprising:

a memory having computer readable instructions; and one or more processors for executing the computer readable instructions, the computer readable instructions controlling the one or more processors to perform operations comprising:

collecting statistics of an original database;

collecting statistics of a sampling database that comprises a subset of the original database;

periodically updating the statistics of the original database in response to an update to the original database and based at least in part on a log of the original database;

periodically comparing the statistics of the original database and the statistics of the sampling database to determine whether the sampling database is within a predetermined threshold of the original database; and in response to determining that the sampling database is not within the predetermined threshold of the original database, initiating an update to the sampling database and causing an analytics service to access the sampling database instead of the original database to perform data analysis, thereby reducing processing overhead and network traffic.

10. The system of claim 9, wherein the initiating an update to the sampling database comprises outputting a recommendation to recreate the sampling database based at least in part on the original database.

11. The system of claim 9, wherein the initiating an update to the sampling database comprises automatically recreating the sampling database based at least in part on the original database.

12. The system of claim 9, wherein the initiating an update to the sampling database comprises one of outputting a recommendation to update a subset of the sampling database based at least in part on the original database and automatically updating a subset of the sampling database based at least in part on the original database.

13. The system of claim 9, wherein the operations further comprise:

creating a sampling definition structure; and creating the sampling database based at least in part on the sampling definition structure and the original database.

14. The system of claim 13, wherein the sampling definition structure comprises a sampling rate, the predetermined threshold, a frequency of the comparing, and an action performed in response to the initiating an update.

15. The system of claim 9, wherein the statistics of the original database and the statistics of the sampling database each comprise an overall record count, a cardinality of a column, and a histogram statistic for the column.

16. The system of claim 9, wherein the comparing comprises comparing a relative frequency of a range of values in a column.

17. A computer program product comprising a computer readable storage medium having program instructions embodied therewith, the program instructions executable by a processor to cause the processor to perform operations comprising:

collecting statistics of an original database;

collecting statistics of a sampling database that comprises a subset of the original database;

periodically updating the statistics of the original database in response to an update to the original database and based at least in part on a log of the original database;

periodically comparing the statistics of the original database and the statistics of the sampling database to determine whether the sampling database is within a predetermined threshold of the original database; and in response to determining that the sampling database is not within the predetermined threshold of the original database, initiating an update to the sampling database and causing an analytics service to access the sampling database instead of the original database to perform data analysis, thereby reducing processing overhead and network traffic.

* * * * *